US012520149B2

(12) United States Patent
Holt et al.

(10) Patent No.: US 12,520,149 B2
(45) Date of Patent: *Jan. 6, 2026

(54) TECHNOLOGIES FOR ACCESS CONTROL COMMUNICATIONS

(71) Applicant: Schlage Lock Company LLC, Carmel, IN (US)

(72) Inventors: Frederick Holt, Noblesville, IN (US); Dennis T. Anfield, Carmel, IN (US); Nathanael L. Thomas, Carmel, IN (US); Joseph W. Baumgarte, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/383,067

(22) Filed: Oct. 24, 2023

(65) Prior Publication Data

US 2024/0323688 A1    Sep. 26, 2024

Related U.S. Application Data

(63) Continuation of application No. 17/203,202, filed on Mar. 16, 2021, now Pat. No. 11,800,359, which is a
(Continued)

(51) Int. Cl.
*H04W 12/084* (2021.01)
*H04W 12/06* (2021.01)
(Continued)

(52) U.S. Cl.
CPC ....... *H04W 12/084* (2021.01); *H04W 12/068* (2021.01); *H04W 12/082* (2021.01); *H04W 88/16* (2013.01)

(58) Field of Classification Search
CPC ............ H04W 12/084; H04W 12/068; H04W 12/082; H04W 88/16; H04W 84/12;
(Continued)

(56) References Cited

U.S. PATENT DOCUMENTS

| 7,775,429 B2 | 8/2010 | Radicella et al. |
| 8,662,386 B2 | 3/2014 | Radicella et al. |

(Continued)

FOREIGN PATENT DOCUMENTS

| CN | 107730669 A1 | 2/2018 |
| CN | 110622222 A | 12/2019 |

(Continued)

OTHER PUBLICATIONS (JP H1091558 A) >>> Computer System (see title) (Year: 1998).*
(Continued)

*Primary Examiner* — David Q Nguyen
(74) *Attorney, Agent, or Firm* — Taft Stettinius & Hollister LLP

(57) ABSTRACT

A method according to one embodiment includes receiving, by a gateway device and from an access control device, credential data received by the access control device from a mobile device in response to presentation of the mobile device to the access control device, comparing the credential data to a gateway credential list stored in a memory of the gateway device, the gateway credential list identifying a plurality of credentials associated with the gateway device, and each credential of the plurality of credentials associated with a unique credential index, transmitting, to a server, the unique credential index associated with the credential data in response to determining that the credential data matches a corresponding credential in the gateway credential list, and
(Continued)

receiving, from the server, an access control decision associated with the credential data in response to transmitting the unique credential index.

13 Claims, 7 Drawing Sheets

Related U.S. Application Data continuation of application No. 16/587,725, filed on Sep. 30, 2019, now Pat. No. 10,952,077.

(51) Int. Cl.
  *H04W 12/082* (2021.01)
  *H04W 88/16* (2009.01)
(58) Field of Classification Search
  CPC ... H04W 12/08; H04W 12/069; H04W 12/06; H04W 12/30; H04W 12/33; H04W 12/37; H04W 12/63; H04W 12/60; H04W 12/64; H04W 12/69; H04W 12/72; H04W 12/77; H04W 28/0835; H04W 28/0838; H04W 48/00; H04W 48/02; H04W 48/04; H04W 48/16; H04W 48/14; H04W 88/08; H04W 88/00; H04W 88/085; H04W 88/18; H04W 92/12; H04W 92/10; H04W 92/22; H04W 72/29; H04W 12/79; H04W 4/021; H04W 4/38; H04W 4/33; H04W 4/70; H04W 4/02; H04W 4/80; H04W 4/21; H04W 88/02; H04L 63/0892; H04L 9/40; H04L 67/02; H04L 67/10; H04L 51/52; H04L 67/00; H04M 1/72403; H04M 1/2757
  USPC .................................. 370/328, 329, 330, 331
  See application file for complete search history.

(56) References Cited

U.S. PATENT DOCUMENTS

| | | | |
|---|---|---|---|
| 8,689,294 | B1 | 4/2014 | Thakur et al. |
| 8,881,252 | B2 | 11/2014 | Van Till et al. |
| 9,153,083 | B2 | 10/2015 | Radicella et al. |
| 9,336,633 | B2 | 5/2016 | Radicella et al. |
| 9,406,181 | B2 | 8/2016 | Almomani et al. |
| 9,462,089 | B1* | 10/2016 | Fallows .................. H04L 69/22 |
| 9,558,606 | B2 | 1/2017 | Radicella et al. |
| 9,589,400 | B2 | 3/2017 | Radicella et al. |
| 9,762,564 | B1* | 9/2017 | Angelov .............. H04W 12/08 |
| 9,792,747 | B2 | 10/2017 | Baumgarte et al. |
| 10,083,560 | B2 | 9/2018 | Baumgarte et al. |
| 10,089,801 | B1 | 10/2018 | Musabeyoglu et al. |
| 10,311,664 | B2 | 6/2019 | Baumgarte et al. |
| 10,740,995 | B2 | 8/2020 | Ashok et al. |
| 10,755,507 | B2 | 8/2020 | Zwink et al. |
| 10,952,077 | B1 | 3/2021 | Holt et al. |
| 11,302,336 | B2 | 4/2022 | Langenberg et al. |
| 2002/0112186 | A1* | 8/2002 | Ford et al. .................... 713/201 |
| 2007/0094716 | A1 | 4/2007 | Farino et al. |
| 2007/0200665 | A1 | 8/2007 | Studerus |
| 2008/0045234 | A1* | 2/2008 | Reed ..................... H04W 4/023 455/456.1 |
| 2008/0209506 | A1 | 8/2008 | Ghai et al. |
| 2009/0119762 | A1* | 5/2009 | Thomson et al. ................ 726/7 |
| 2009/0132813 | A1 | 5/2009 | Schibuk |
| 2010/0263022 | A1 | 10/2010 | Wynn et al. |
| 2011/0285528 | A1 | 11/2011 | Weinstein et al. |
| 2012/0119877 | A1 | 5/2012 | Ng et al. |
| 2012/0129451 | A1 | 5/2012 | Metivier |
| 2012/0280783 | A1 | 11/2012 | Gerhardt et al. |
| 2013/0055365 | A1 | 2/2013 | Sturges |
| 2013/0297075 | A1 | 11/2013 | Land, III |
| 2014/0002236 | A1 | 1/2014 | Pineau et al. |
| 2014/0028438 | A1 | 1/2014 | Kuenzi et al. |
| 2014/0049695 | A1* | 2/2014 | Papish et al. .................. 348/731 |
| 2014/0096215 | A1* | 4/2014 | Hessler ................. H04W 12/06 726/7 |
| 2014/0120905 | A1 | 5/2014 | Kim |
| 2014/0340195 | A1 | 11/2014 | Polak et al. |
| 2015/0254917 | A1 | 9/2015 | Rockermann et al. |
| 2015/0347729 | A1 | 12/2015 | Eberwine et al. |
| 2016/0301689 | A1* | 10/2016 | Roy et al. ........... H04L 63/0853 |
| 2016/0352816 | A1* | 12/2016 | Xiao ................. H04M 1/72403 |
| 2017/0018130 | A1 | 1/2017 | Robinson |
| 2017/0053466 | A1* | 2/2017 | Ouellette ........... G07C 9/00103 |
| 2017/0061720 | A1 | 3/2017 | Tse |
| 2017/0093700 | A1 | 3/2017 | Gilley et al. |
| 2017/0236347 | A1 | 8/2017 | Drako et al. |
| 2017/0301162 | A1 | 10/2017 | Radicella et al. |
| 2017/0337756 | A1 | 11/2017 | Radicella et al. |
| 2018/0063150 | A1 | 3/2018 | Rovito et al. |
| 2018/0068503 | A1 | 3/2018 | Prasad et al. |
| 2018/0077022 | A1 | 3/2018 | Van Oost et al. |
| 2018/0182191 | A1 | 6/2018 | Wagstaff |
| 2018/0315262 | A1* | 11/2018 | Love .......................... G07C 9/00309 |
| 2019/0035181 | A1 | 1/2019 | Musabeyoglu et al. |
| 2019/0035190 | A1 | 1/2019 | Szczygiel |
| 2019/0278955 | A1 | 9/2019 | Mani et al. |
| 2019/0312737 | A1 | 10/2019 | Mani et al. |
| 2019/0342284 | A1 | 11/2019 | Vohra et al. |
| 2020/0028815 | A1* | 1/2020 | He .......................... H04L 51/52 |
| 2020/0202866 | A1 | 6/2020 | Langenberg et al. |
| 2020/0334930 | A1 | 10/2020 | Masood |

FOREIGN PATENT DOCUMENTS

| | | | | |
|---|---|---|---|---|
| EP | | 3139353 A1 | 3/2017 | |
| WO | WO 2007050481 A2 * | | 5/2007 | ............... H04L 9/32 |
| WO | | 2017183044 A1 | 10/2017 | |

OTHER PUBLICATIONS

International Search Report; International Searching Authority; International Application No. PCT/US2020/053541; Dec. 22, 2020; 2 pages.
Written Opinion of the International Searching Authority; International Searching Authority; International Application No. PCT/US2020/053541; Dec. 22, 2020; 3 pages.
Method and Apparatus for Controlling Home Network Access Using Phone Numbers, and System Thereof; KR 20120064916A (Year: 2012).
Gateway Unit and Portable Device; JP 2004328578A (Year: 2004).
Extended European Search Report; European Patent Office; European Application No. 20872627.3; Oct. 11, 2023; 5 pages.

* cited by examiner

TECHNOLOGIES FOR ACCESS CONTROL COMMUNICATIONS

CROSS REFERENCE TO RELATED APPLICATIONS

This application is a continuation of U.S. patent application Ser. No. 17/203,202 filed Mar. 16, 2021 and issued as U.S. Pat. No. 11,800,359, which is a continuation of U.S. patent application Ser. No. 16/587,725 filed Sep. 30, 2019 and issued as U.S. Pat. No. 10,952,077, the contents of which are incorporated herein by reference in their entirety.

BACKGROUND

Access control systems typically involve the use of credentials to manage the operation of an access control device (e.g., a lock device). Such credentials may be assigned to a particular user or device and are often physical in nature, forming at least a portion of, for example, a smartcard, proximity card, key fob, token device, or mobile device. Thus, current credential systems generally require an interaction between the credential and a reader device (e.g., on or secured to the access control device) such that the reader device may read the credential and determine whether access should be granted.

Access control permissions and other access control data are updated for various users/credentials over time and, therefore, those updates are often transmitted to access control devices that make access control decisions locally based on user-presented credentials. Depending on the particular access control ecosystem, the number of users and credentials can be staggering. As such, the limited data storage available on many access control devices, for example, introduces technical difficulties in ensuring that those access control devices maintain complete and accurate access control data.

SUMMARY

One embodiment is directed to a unique system, components, and methods for access control communications. Other embodiments are directed to apparatus, systems, devices, hardware, methods, and combinations thereof for access control communications. This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
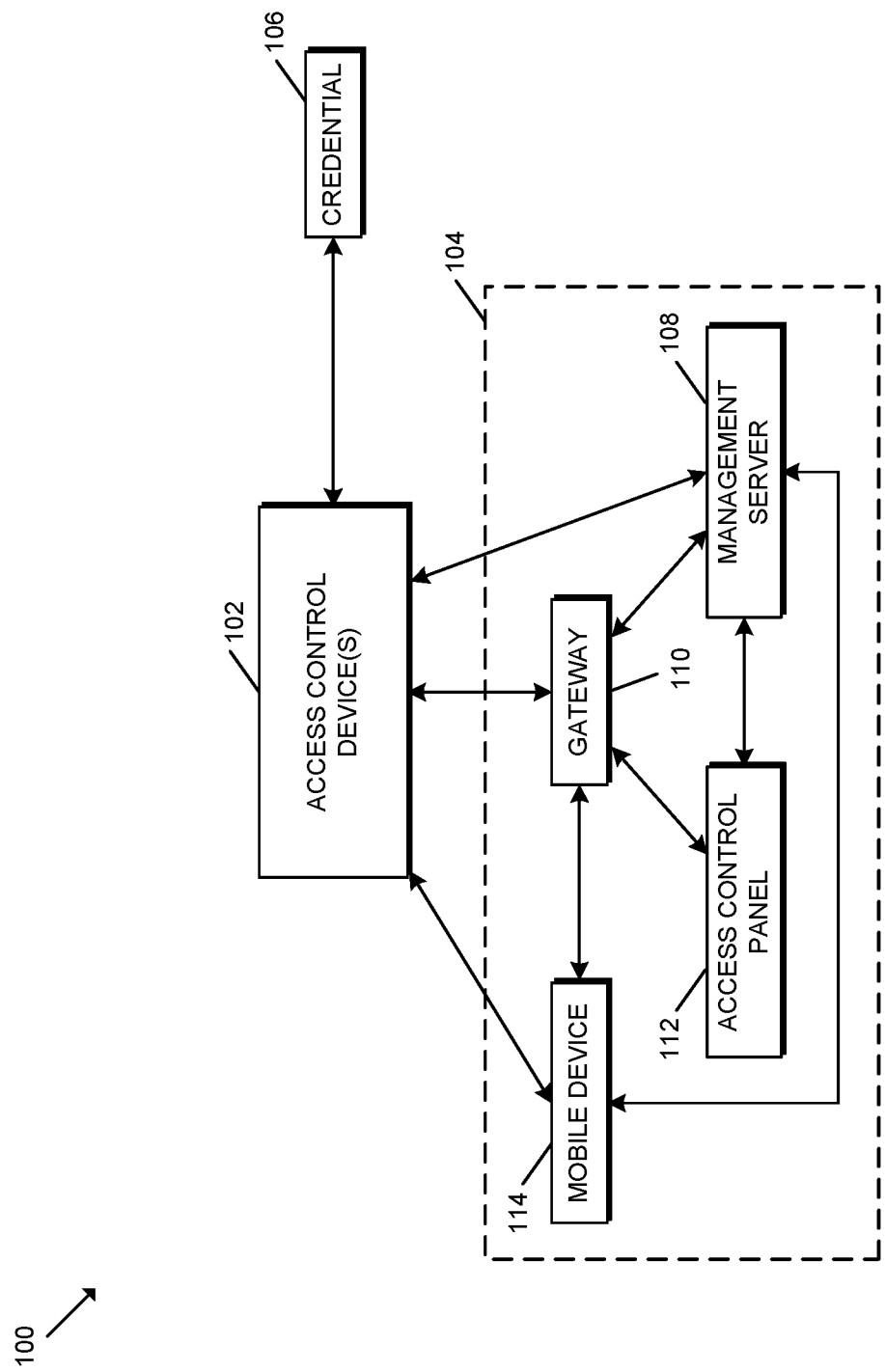
FIG. 1 is a simplified block diagram of an access control system.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, an access control system 100 includes one or more access control devices 102, a management system 104, and a credential device 106. Further, the management system 104 may include a management server 108, a gateway device, 110, an access control panel 112, and/or a mobile device 114.

As described in detail below, in the illustrative embodiment, the access control system 100 allows for a true real-time solution of access control that provides the IP host (e.g., the management server 108) with relevant information regarding credentials that are presented to an access control device 102. Specifically, in some embodiments, the access control system 100 may allow for a true real-time access control solution while providing the host device (e.g., the management server 108) with information regarding credentials presented to the access control device 102, and providing such data to an extent that may not be otherwise feasible due to memory constraints in various access control devices 102. For example, in some access control solutions, there is a need for the host (e.g., the management server 108) to be provided with information regarding credentials that are presented to the access control device 102 regardless of whether or not the credential information associated with those credentials are already included in a local access control database of the access control device 102 (i.e., for making access control decisions locally at the access control device 102). However, often due to limited memory capacity in the access control device 102, it may be unrealistic to store and/or provide a large amount of credential information (e.g., in a large enterprise or commercial environment) to the access control device 102; yet, such limitations are often not imposed on gateway devices 110. Accordingly, in some embodiments, the gateway device 110 includes a gateway credential list stored thereon, which may include substantially more credential information than the local access control database of the access control device 102 and/or may be leveraged to make access control decisions as described in greater detail herein.

It should be appreciated that the access control device(s) 102, the management system 104, the credential 106, the management server 108, the gateway device 110, the access control panel 112, and/or the mobile device 114 may be embodied as any type of device or collection of devices suitable for performing the functions described herein. More specifically, in the illustrative embodiment, each of the access control devices 102 (e.g., edge devices) may be embodied as any type of device capable of controlling and/or facilitating access through a passageway (e.g., at least in part). For example, in various embodiments, the access control device 102 may be embodied as an electronic lock (e.g., a mortise lock, a cylindrical lock, or a tubular lock), an exit device (e.g., a pushbar or pushpad exit device), a door closer, an auto-operator, a motorized latch/bolt (e.g., for a sliding door), barrier control device (e.g., battery-powered), or a peripheral controller of a passageway. Depending on the particular embodiment, the access control device 102 may include a credential reader or be electrically/communicatively coupled to a credential reader configured to communicative with credentials 106. In some embodiments, the access control device 102 may have a local access control database stored thereon for locally performing access control decisions associated with user access. Accordingly, in such embodiments, the access control database may store credential data, biometric data, historical information, PINs, passcodes, and/or other relevant authentication data associated with users. In some embodiments, such data or a portion thereof may additionally or alternatively be stored in a centralized access control database (e.g., hosted by and/or accessible to the management server 108).

In some embodiments, one or more of the credentials 106 may be embodied as a passive credential device having a credential identifier or value (e.g., a unique ID) stored therein and is "passive" in the sense that the credential device is configured to be powered by radio frequency (RF) signals received from a credential reader. In other words, such passive credentials do not have an independent power source but, instead, rely on power that is induced from RF signals transmitted from other devices in the vicinity of the credential. In particular, in some embodiments, one or more of the passive credentials may be embodied as a proximity card, which is configured to communicate over a low frequency carrier of nominally 125 kHz, and/or a smartcard, which is configured to communicate over a high frequency carrier frequency of nominally 13.56 MHz. However, it should be appreciated that, in other embodiments, each of the credentials 106 may be embodied as any type of passive or active credential device capable of performing the functions described herein. For example, in some embodiments, one or more of the credentials 106 may be embodied as a virtual credential stored on the mobile device 114 and/or other computing device of a particular user.

As described herein, the management system 104 may be configured to manage credentials of the access control system 100. For example, depending on the particular embodiment, the management system 104 may be responsible for ensuring that the access control devices 102 have updated local access control databases, authorized credentials, whitelists, blacklists, device parameters, and/or other suitable data. Additionally, in some embodiments, the management system 104 may receive security data, audit data, raw sensor data, and/or other suitable data from the access control devices 102 for management of the access control system 100. In some embodiments, one or more of the devices of the management system 104 may be embodied as an online server or a cloud-based server. Further, in some embodiments, the management system 104 may communicate with multiple access control devices 102 at a single site (e.g., a particular building) and/or across multiple sites. That is, in such embodiments, the management system 104 may be configured to receive data from access control devices 102 distributed across a single building, multiple buildings on a single campus, or across multiple locations.

It should be appreciated that the management system 104 may include one or more devices depending on the particular embodiment of the access control system 100. For example, as shown in FIG. 1, the management system 104 may include a management server 108, a gateway device 110, an access control panel 112, and/or a mobile device 114 depending on the particular embodiment. The functions of the management system 104 described herein may be performed by one or more of those devices in various embodiments. For example, in some embodiments, the management server 108 may perform all of the functions of the management system 104 described herein. Further, in some embodiments, the gateway device 110 may be communicatively coupled to the access control devices 102 such that the other devices of the management system 104 (e.g., the management server 108, the access control panel 112, and/or the mobile device 114) may communicate with the access control devices 102 via the gateway device 110.

In some embodiments, the access control devices 102 may communicate with the management server 108 over a Wi-Fi connection and/or with the mobile device 114 over a Bluetooth connection. Additionally, the access control devices 102 may communicate with the management server 108 and/or the access control panel 112 via the gateway device 110. As such, in the illustrative embodiment, the access control device 102 may communicate with the gateway device 110 over a Wi-Fi connection and/or a Bluetooth connection, and the gateway device 110 may, in turn, forward the communicated data to the relevant management server 108 and/or access control panel 112. For example, in some embodiments, the gateway device 110 may communicate with the access control panel 112 over a serial communication link (e.g., using RS-485 standard communication), and the gateway device 110 may communicate with the management server 108 over a Wi-Fi connection, an Ethernet connection, and/or another wired/wireless communication connection. As such, it should be appreciated that each of the access control devices 102 may communicate with the management server 108 via an online mode with a persistent real-time communication connection or via an offline mode (e.g., periodically or in response to an appropriate condition) depending on the particular embodiment (e.g., depending on whether the particular access control device 102 is offline). It should be appreciated that various technologies for implementing such access control communications are described in greater detail herein. As indicated above, in other embodiments, it should be appreciated that the access control devices 102 may communicate with the devices of the management system 104 via one or more other suitable communication protocols.

In some embodiments, the gateway device 110 may be embodied as any one or more devices that, individually or collectively, serve as an intermediary device allowing the access control devices 102 to communicate with the management server 108 and/or other remote devices via the Internet and/or a wired/wireless network. For example, in some embodiments, the gateway device 110 may be embodied as a wireless access point that is communicatively coupled to a router. In other embodiments, the gateway device 110 may form an integral component of or otherwise form a portion of the router itself.

It should be appreciated that each of the access control devices 102, the management system 104, the management server 108, the gateway device 110, the access control panel 112, and/or the mobile device 114 may be embodied as one or more computing devices similar to the computing device 200 described below in reference to FIG. 2. For example, one or more of the access control devices 102, the management system 104, the management server 108, the gateway device 110, the access control panel 112, and the mobile device 114 may include a processing device 202 and a memory 206 having stored thereon operating logic 208 for execution by the processing device 202 for operation of the corresponding device.

It should be further appreciated that, although the management system 104 and the management server 108 are described herein as one or more computing devices outside of a cloud computing environment, in other embodiments, the system 104 and/or server 108 may be embodied as a cloud-based device or collection of devices. Further, in cloud-based embodiments, the system 104 and/or server 108 may be embodied as a "serverless" or server-ambiguous computing solution, for example, that executes a plurality of instructions on-demand, contains logic to execute instructions only when prompted by a particular activity/trigger, and does not consume computing resources when not in use. That is, the system 104 and/or server 108 may be embodied as a virtual computing environment residing "on" a computing system (e.g., a distributed network of devices) in which various virtual functions (e.g., Lambda functions, Azure functions, Google cloud functions, and/or other suitable virtual functions) may be executed corresponding with the functions of the system 104 and/or server 108 described herein. For example, when an event occurs (e.g., data is transferred to the system 104 and/or server 108 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of updated access control data is made by a user (e.g., via an appropriate user interface to the system 104 or server 108), the appropriate virtual function(s) may be executed to perform the actions before eliminating the instance of the virtual function(s).

Although only one management system 104, one credential 106, one management server 108, one gateway device 110, one access control panel 112, and one mobile device 114 are shown in the illustrative embodiment of FIG. 1, the system 100 may include multiple management systems 104, credentials 106, management servers 108, gateway devices 110, access control panels 112, and/or mobile devices 114 in other embodiments. For example, as indicated above, the server 108 may be embodied as multiple servers in a cloud computing environment in some embodiments. Further, each user may be associated with one or more separate credentials 106 in some embodiments.

Figure 2:
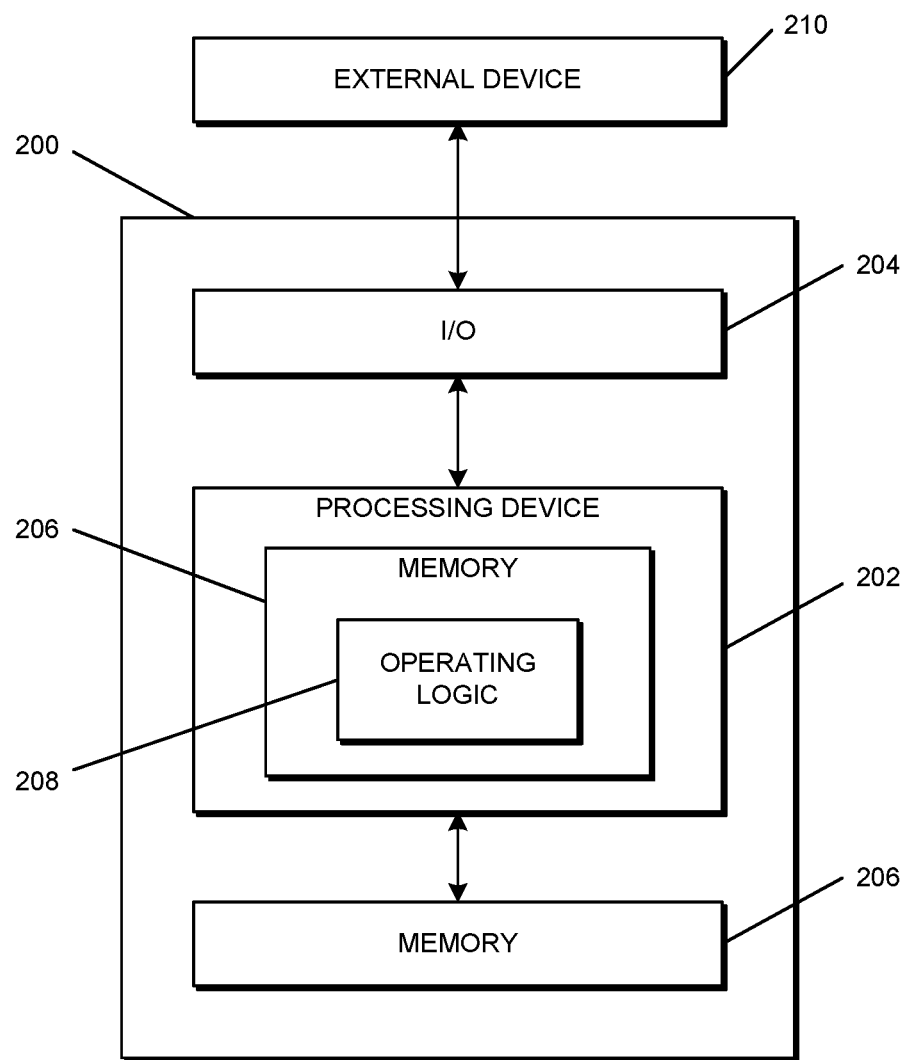
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of an access control device 102, management system 104, credential 106 (e.g., an active credential), management server 108, gateway device 110, access control panel 112, and/or mobile device 114 illustrated in FIG. 1. Depending on the particular embodiment, computing device 200 may be embodied as an access control device, reader device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth (including Bluetooth Low Energy (BLE), Wi-Fi, Near Field Communication (NFC), WiMAX, ZigBee, Z-wave, IEEE 802.15, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the access control device 102, the management system 104, the credential 106, the management server 108, the gateway device 110, the access control panel 112, and/or the mobile device 114. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

As described in greater detail below, the access control system 100 may utilize one or more different modes of operation in order to transmit data among the various devices in the access control system 100 and, more specifically, between the access control device 102 and the server 108. For example, in various embodiments, the access control system 100 may utilize an "offline mode," an "offline with Wi-Fi mode," a "gateway as server mode," a "gateway as client mode," a "serial communication mode," or a "modified gateway as client mode." Additionally, in some embodiments, the access control system 100 may leverage "no tour" functionality to transmit data to offline access control devices 102, whereby access control data updates (e.g., access permissions, database updates, configurations, etc.) are transmitted to the offline access control devices 102 via the mobile device 114 and/or credential 106. It should be appreciated that the terms "offline mode," "offline with Wi-Fi mode," "gateway as server mode," "gateway as client mode," "serial communication mode," "modified gateway as client mode," and "no tour" are used herein for reference purposes only and not intended to be limiting.

In some embodiments, the access control system 100 may utilize an "offline mode" in which the access control device 102 functions as a standalone device with "decision at door" capabilities such that the access control device 102 authenticates credential data and/or makes access control decisions locally at the access control device 102 (e.g., based on a local access control database or door file). Accordingly, the system 100 may rely on the access rights for authorized credentials and/or device configurations having been preloaded onto the local access control database and/or other memory of the access control device 102. For example, in some embodiments, the access control data may be transmitted to the local access control database of the access control device 102 via the mobile device 114 (e.g., using a mobile application and wireless communication protocol such as BLE) or using the no tour techniques described herein. Similarly, in some embodiments, the access control device 102 can transmit audits, device configurations, status indications, and/or other relevant data to the server 108 via the mobile device 114 and/or using no tour techniques having feedback mechanisms. It should be appreciated that the "offline mode" involves a user physically visiting the access control device 102 in order to perform the data transfers described above.

In some embodiments, the access control system 100 may utilize an "offline with Wi-Fi mode" in which the access control device 102 generally functions similarly to the "offline mode." However, in the "offline with Wi-Fi mode," the access control device 102 includes Wi-Fi and/or other wireless communication circuitry capable of communicating with the server 108 (e.g., via a router) to communicate access control data therebetween. Depending on the particular embodiment, the access control device 102 may establish the Wi-Fi connection with the server 108 in order to transmit and receive relevant access control data periodically, asynchronously, according to a predetermined or dynamic schedule, and/or in response to some condition while also maintaining the "decision at door" functionality of the "offline mode" described above. For example, in some embodiments, the access control device 102 may establish a Wi-Fi connection and communicate with the server 108 one or more times daily (e.g., at times of historically low use of the access control device 102). Additionally or alternatively, in some embodiments, the access control device 102 may establish the Wi-Fi connection to communicate with the server 108 in response to one or more predefined (or dynamically determined) asynchronous events including, for example, a forced door alert, tamper alert, low battery notification, critical battery notification, magnetic tamper alert, corrupt file notification (e.g., access control database or door file), reader tamper alert, and/or other events.

In some embodiments, the access control system 100 may utilize a "serial communication mode" in which the access control system 100 has "decision at host" capabilities such that the server 108 or the access control panel 112 authenticates credential data and/or makes access control decisions remotely relative to the access control device 102 (e.g., based on a centralized access control database of the management system 104). For example, in some embodiments, the access control panel 112 may be communicatively coupled to the gateway device 110 via a serial communication link and corresponding communication protocol (e.g., RS-485 communication protocol), and the gateway device 110 may wirelessly communicate (e.g., via Bluetooth) with the access control device 102. In particular, in some embodiments, the gateway device 110 may be configured to "consume" and reply to relevant messages at the next available poll response (e.g., under the RS-485 communication protocol). Accordingly, the access control device 102 may transmit credential data associated with a presented credential to the gateway device 110, and the gateway device 110 may transmit the encrypted credential data to the access control panel 112 (and/or server 108) at the next available poll response. Further, the access control panel 112 (and/or server 108) may authenticate the credential data and make an access control decision (e.g., grant/deny access), which may be transmitted to the gateway device 110 for subsequent transmittal to the access control device 102 (e.g., in the form of an "unlock" command). In some embodiments, status changes of the access control device 102 may be automatically transmitted to the gateway device 110, which may be forwarded to the access control panel 112 (and/or server 108) at the next available poll response. It should be appreciated that, in various embodiments, the "serial communication mode" may allow the access control panel 112 (and/or server 108) to "see" all credential data presented to the access control device 102. At least one embodiment of the "serial communication mode" is described below in reference to the method 300 of FIG. 3.

In some embodiments, the access control system 100 may utilize an IP-based solution that leverages the gateway device 110 for communication between the access control device 102 and the server 108. For example, in some embodiments, the server 108 may communicate with the gateway device 110 via IP communications (e.g., and Ethernet), and the gateway device 110 in turn may process any messages related to the gateway device 110 itself and/or forward any messages (e.g., via Bluetooth) intended for the access control device 102. It should be appreciated that such techniques permit the access control device to have "decision at door" functionality as described above; however, in such embodiments, the access control device 102 may transmit status change information, audit data, and/or other relevant information to the gateway device 110 (e.g., automatically) for subsequent delivery by the gateway device 110 to the server 108. Similarly, the server 108 may transmit access control data (e.g., access permissions, configuration data, etc.) to the gateway device 110 for subsequent delivery by the gateway device 110 to the access control device 102. As such, when a credential device is presented to the access control device 102, the access control device 102 may authenticate (e.g., making a grant/deny decision) the credential data locally based on the local access control database of the access control device 102, which may be loaded/updated based on access control data communications received from the server 108 via the gateway device 110. Specifically, in various embodiments, the access control system 100 may utilize the "gateway as server mode," "gateway as client mode," or "modified gateway as client mode" described below.

As indicated above, in some embodiments, the access control system 100 may utilize a "gateway as server mode" in which the server 108 acts as a client device and the gateway device 110 acts as a server (e.g., web server) in a server/client IP communication arrangement. For example, in some embodiments, the server 108 (acting as a client device) may communicate with the gateway device 110 via a RESTful API or other suitable API hosted by the gateway device 110 (acting as the server). Audit data, status changes, and other information received by the gateway device 110 from the access control device 102 may be stored at the gateway device 110 until the server 108 (as client) as requested the updated information from the gateway device 110 (as server). Accordingly, in such embodiments, it should be appreciated that that the gateway device 110 relies on receipt of a communication from the server 108 in order to transmit relevant access control data updates. At least one embodiment of the "gateway as server mode" is described below in reference to the method 400 of FIG. 4.

In some embodiments, the access control system 100 may utilize a "gateway as client mode" as indicated above in which the server 108 acts as a server (e.g., web server) and the gateway device 110 acts as a client device in a server/client IP communication arrangement. In such embodiments, the gateway device 110 (as client) may attempt to reach the server 108 (as server) and authenticate the server 108 (e.g., to ensure a secure connection therebetween). Subsequent to establishing the secure connection, the gateway device 110 may request to open a WebSocket connection between the gateway device 110 and the server 108, which allows for full duplex communication between the gateway device (as client) and the server 108 (as server). Accordingly, in some embodiments, the server 108 may make requests of the gateway device 110 by transforming RESTful API (or other suitable API) requests (e.g., as utilized in the "gateway as server mode" described above) into a WebSocket communication sub-protocol. It should be appreciated that the "gateway as a client mode" allows for the gateway device 110 to be situated "behind" a firewall and still communicate with the server 108 without additional overhead of port forwarding or network mapping, which may be required if the server 108 and the gateway device 110 are on different subnets (e.g., as in some embodiments of "gateway as server mode"). Further, once the WebSocket connection has been established, the gateway device 110 need not wait until a request is made of it in order to provide information to the server 108. That is, in the "gateway as client mode," the gateway device 110 may provide information to the server 108 in real time without waiting for the server 108 to request such information, which may permit the server 108 to "subscribe" to information associated with particular events and allow the gateway device 110 to notify the server 108 in real time if any such "subscribed" event occurs. At least one embodiment of the "gateway as client mode" is described below in reference to the method 500 of FIG. 5.

In some embodiments, the access control system 100 may utilize a "modified gateway as client mode" as indicated above, which may allow for a true real-time solution of access control that provides the IP host (e.g., the server 108) with relevant information of credentials that are presented to the access control device 102. In particular, in some embodiments, the "modified gateway as client mode" addresses a technical need in some access control systems for the server 108 to be provided with information regarding credentials that are presented to the access control device 102 regardless of whether or not the credential data associated with that particular credential 106 is already included in the local access control database (or door file) of the access control device 102 for "decision at door" operation. More specifically, although it may be unrealistic or impossible (e.g., in very large enterprise environments) to provide a very large amount of credential data to the access control device 102 for notification purposes due to memory constraints of the access control device 102, the memory constraints of the gateway device 110 are often less limiting. As such, in some embodiments, the gateway device 110 may store therein a gateway credential list (GCL) with a significant amount of credential data (e.g., more data than capable of being stored in the memory of the access control device 102). In particular, in some embodiments, the gateway credential list may include/identify a set of credentials (e.g., as credential data, encrypted credential data, or otherwise) and a unique credential index associated with each such credential identified in the list. For example, in some embodiments, the credential indexes may be generated as strictly increasing (or strictly decreasing) indexes. In other embodiments, it should be appreciated that the unique credential indexes may be generated randomly, pseudo-randomly, cryptographically uniquely, and/or otherwise generated in a manner that ensures that no (or minimal) collisions occur. Although the gateway credential list is described herein as a list, it should be appreciated that the gateway credential list may be formatted according to any suitable data structure.

In some embodiments, when the credential is presented to the access control device 102, the access control device 102 transmits the credential data to the gateway device 110 (e.g., in encrypted or unencrypted form depending on the particular embodiment). If the credential (e.g., in the form of credential data) already exists in the gateway credential list of the gateway device 110, the gateway device 110 may transmit the respective credential index associated with that credential to the server 108 (e.g., via a WebSocket connection). However, if the credential is not included in the gateway credential list, the gateway device 110 may notify the server 108 (e.g., via the WebSocket connection) that a credential has been presented to the access control device 102 that does not exist in the gateway credential list. As such, in some embodiments, the server 108 may request (e.g., via the WebSocket connection) that the gateway device 110 enter an enrollment mode in which the credential data (e.g., in encrypted or unencrypted form) is transmitted to the server 108. In some embodiments, if the server 108 does not provide the access control device 102 with an access control command (e.g., allow/deny access) within a predefined period of time after presentation of the credential, the access control device 102 may resort to "decision at door" functionality in which the access control device 102 may locally make the access control decision 102 based on the current data in the local access control database of the access control device 102. At least one embodiment of the "modified gateway as client mode" is described below in reference to the method 600 of FIG. 6 and the method 700 of FIG. 7.

Figure 3:
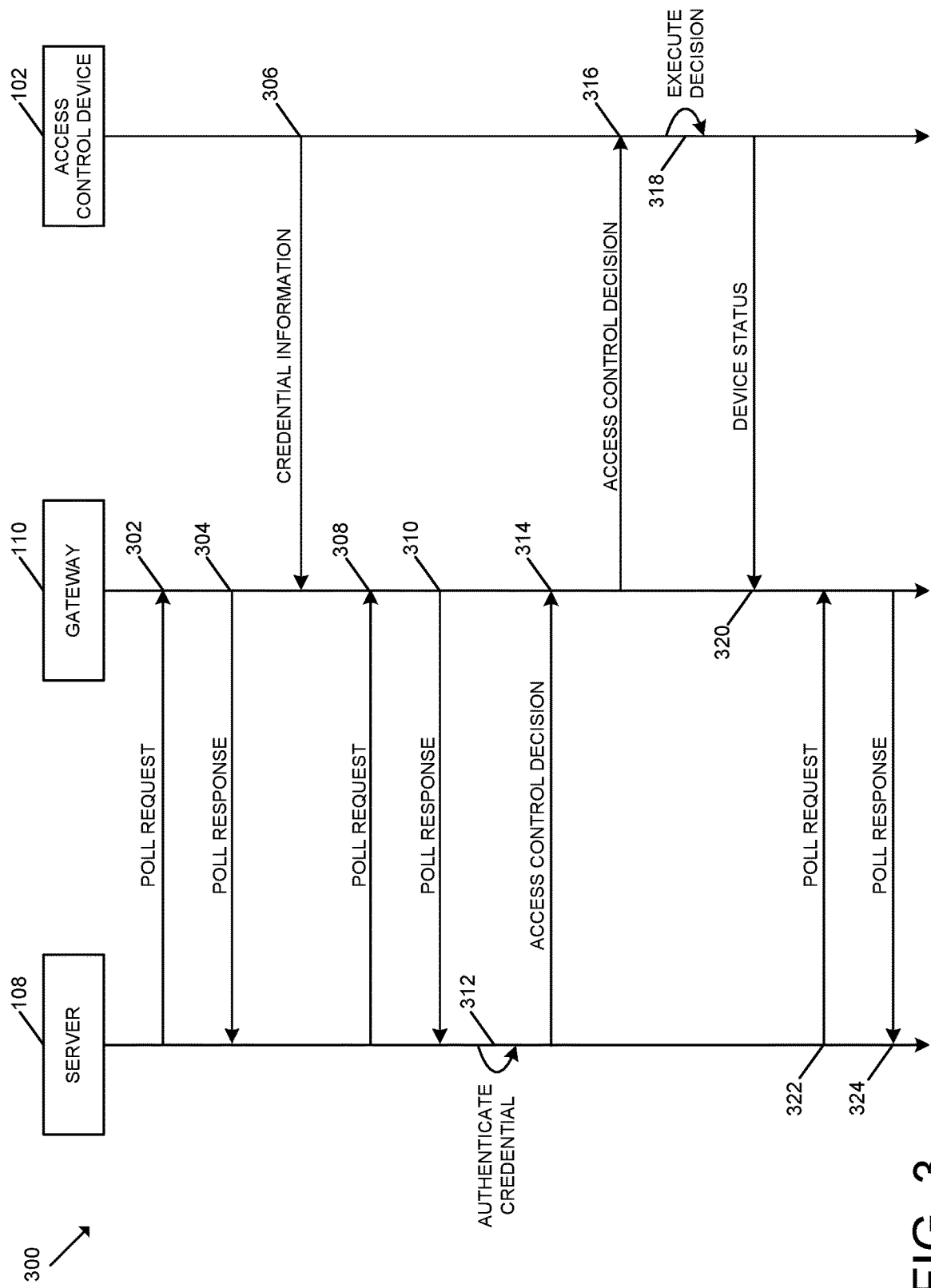
FIG. 3 is a simplified flow diagram of at least one embodiment of a method of communicating access control information by leveraging serial communication between a gateway device and a server.

Referring now to FIG. 3, in use, the access control system 100 may execute a method 300 for communicating access control information by leveraging serial communication between the gateway device 110 and the server 108. It should be appreciated that the particular flows of the method 300 are illustrated by way of example, and such flows may be combined or divided, added or removed, and/or reordered in whole or in part depending on the particular embodiment, unless stated to the contrary. As described above, in some embodiments, the method 300 may be executed in conjunction with one or more of the features described above in reference to the "serial communication mode" of the access control system 100.

The illustrative method 300 begins with flow 302 in which the server 108 transmits a poll request to the gateway device 110. In flow 304, the gateway device 110 evaluates the poll request and transmits a poll response. For example, the gateway device 110 may determine that no changes have occurred at the access control device 102 and transmit a poll response accordingly. At some time (e.g., a later time), a credential 106 may be presented to the access control device 102. In flow 306, the access control device 102 transmits credential information/data associated with the credential 106 to the gateway device 110 (e.g., read from and/or received from the credential 106). In flow 308, at an appropriate time (e.g., periodically or asynchronously), the server 108 transmits another poll request to the gateway device 110. In flow 310, the gateway device 110 again evaluates the poll request and transmits a poll response. For example, in the illustrative embodiment, the gateway device 110 may transmit the credential information received from the access control device 102 since the last poll request/response interaction.

In flow 312, the server 108 authenticates the credential information, for example, to determine access permissions associated with the credential and makes an access control decision/command (e.g., grant/deny access). In flow 314, the server 108 transmits the access control decision to the gateway device 110, which in turn transmits the access control decision to the access control device 102 in flow 316. In flow 318, the access control device 102 executes the access control decision. For example, in some embodiments, the access control device 102 may control an access control mechanism (e.g., a lock mechanism, a motor, and/or other components) to grant/deny access through a passageway.

In flow 320, the access control device 102 may transmit a status of the access control device 102 to the gateway device 110. For example, in some embodiments, the status may indicate the lock status (locked/unlocked) and/or other conditions of the access control device 102. In flow 322, at an appropriate time (e.g., periodically or asynchronously), the server 108 transmits another poll request to the gateway device 110. In flow 324, the gateway device 110 again evaluates the poll request and transmits a poll response. For example, in the illustrative embodiment, the gateway device 110 may transmit the status information received from the access control device 102 since the last post request/response interaction.

Although the flows 302-324 are described in a relatively serial manner, it should be appreciated that various flows of the method 300 may be performed in parallel in some embodiments.

Figure 4:
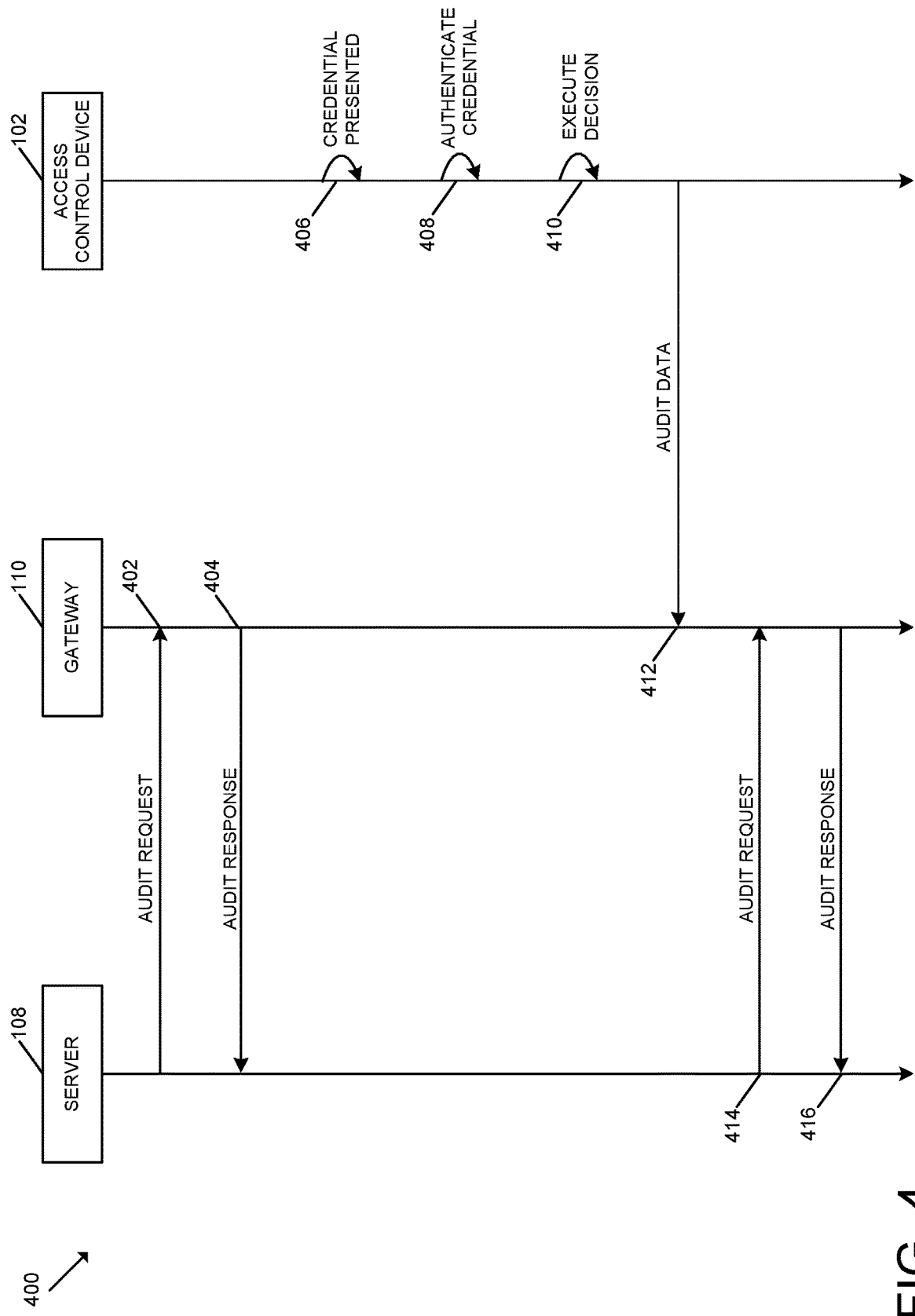
FIG. 4 is a simplified flow diagram of at least one embodiment of a method of communicating access control information by configuring the gateway device to act as a web server to a server.

Referring now to FIG. 4, in use, the access control system 100 may execute a method 400 for communicating access control information by configuring the gateway device 110 to act as a web server to the server 108. It should be appreciated that the particular flows of the method 400 are illustrated by way of example, and such flows may be combined or divided, added or removed, and/or reordered in whole or in part depending on the particular embodiment, unless stated to the contrary. As described above, in some embodiments, the method 400 may be executed in conjunction with one or more of the features described above in reference to the "gateway as server mode" of the access control system 100.

The illustrative method 400 begins with flow 402 in which the server 108 transmits an audit request to the gateway device 110. In flow 404, the gateway device 110 evaluates the audit request and transmits an audit response. For example, the gateway device 110 may determine that no audits have been received from the access control device 102 and transmit an audit response accordingly. At some time (e.g., a later time), in flow 406, a credential 106 may be presented to the access control device 102. In flow 408, the access control device 102 authenticates the credential information based on a local access control database of the access control device 102, for example, to determine access permissions associated with the credential and makes an access control decision/command (e.g., grant/deny access). In flow 410, the access control device 102 executes the access control decision. For example, in some embodiments, the access control device 102 may control an access control mechanism (e.g., a lock mechanism, a motor, and/or other components) to grant/deny access through a passageway.

In flow 412, the access control device 102 transmits audit information/data associated with the credential 106 to the gateway device 110 (e.g., a user identifier, credential identifier, information associated with the access control decision, and/or other access control data). In flow 414, at an appropriate time (e.g., periodically or asynchronously), the server 108 transmits another audit request to the gateway device 110. In flow 416, the gateway device 110 again evaluates the audit request and transmits an audit response. For example, in the illustrative embodiment, the gateway device 110 may transmit the audit information received from the access control device 102 since the last audit request/response interaction.

Although the flows 402-416 are described in a relatively serial manner, it should be appreciated that various flows of the method 400 may be performed in parallel in some embodiments.

Figure 5:
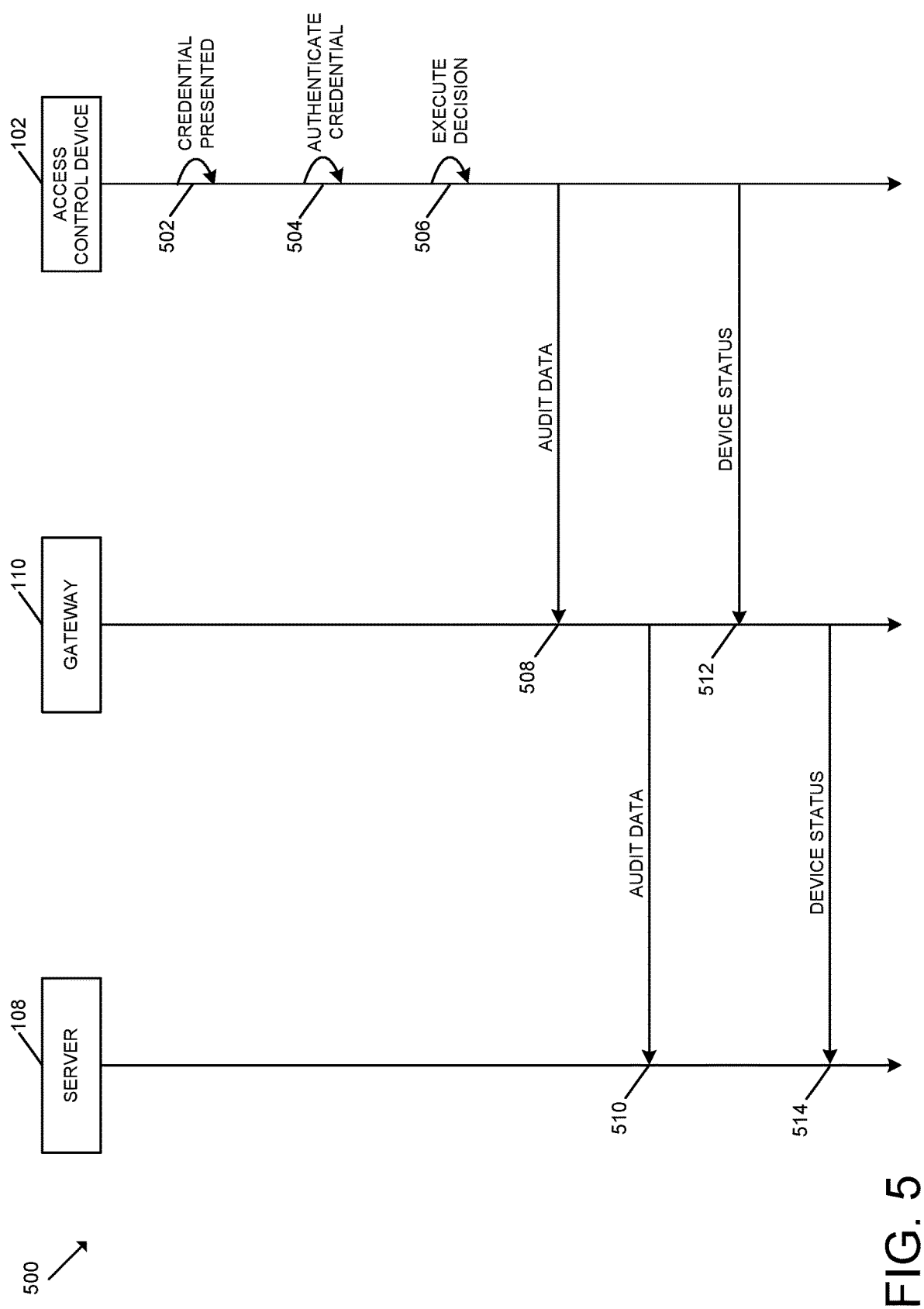
FIG. 5 is a simplified flow diagram of at least one embodiment of a method of communicating access control information by configuring the gateway device to act as a client to a server.

Referring now to FIG. 5, in use, the access control system 100 may execute a method 500 for communicating access control information by configuring the gateway device 110 to act as a client to the server 108. It should be appreciated that the particular flows of the method 500 are illustrated by way of example, and such flows may be combined or divided, added or removed, and/or reordered in whole or in part depending on the particular embodiment, unless stated to the contrary. As described above, in some embodiments, the method 500 may be executed in conjunction with one or more of the features described above in reference to the "gateway as client mode" of the access control system 100.

The illustrative method 500 begins with flow 502 in which a credential 106 may be presented to the access control device 102. In flow 504, the access control device 102 authenticates the credential information based on a local access control database of the access control device 102, for example, to determine access permissions associated with the credential and makes an access control decision/command (e.g., grant/deny access). In flow 506, the access control device 102 executes the access control decision. For example, in some embodiments, the access control device 102 may control an access control mechanism (e.g., a lock mechanism, a motor, and/or other components) to grant/deny access through a passageway.

In flow 508, the access control device 102 transmits audit information/data associated with the credential 106 to the gateway device 110 (e.g., a user identifier, credential identifier, information associated with the access control decision, and/or other access control data), and the gateway device 110 in turn transmits/forwards the audit information/data to the server 108 in flow 510. In flow 512, the access control device 102 may transmit a status of the access control device 102 to the gateway device 110, and the gateway device 110 in turn may transmit/forward the audit information/data to the server 108 in flow 514. For example, in some embodiments, the status may indicate the lock status (locked/unlocked) and/or other conditions of the access control device 101.

Although the flows 502-514 are described in a relatively serial manner, it should be appreciated that various flows of the method 500 may be performed in parallel in some embodiments.

Figure 6:
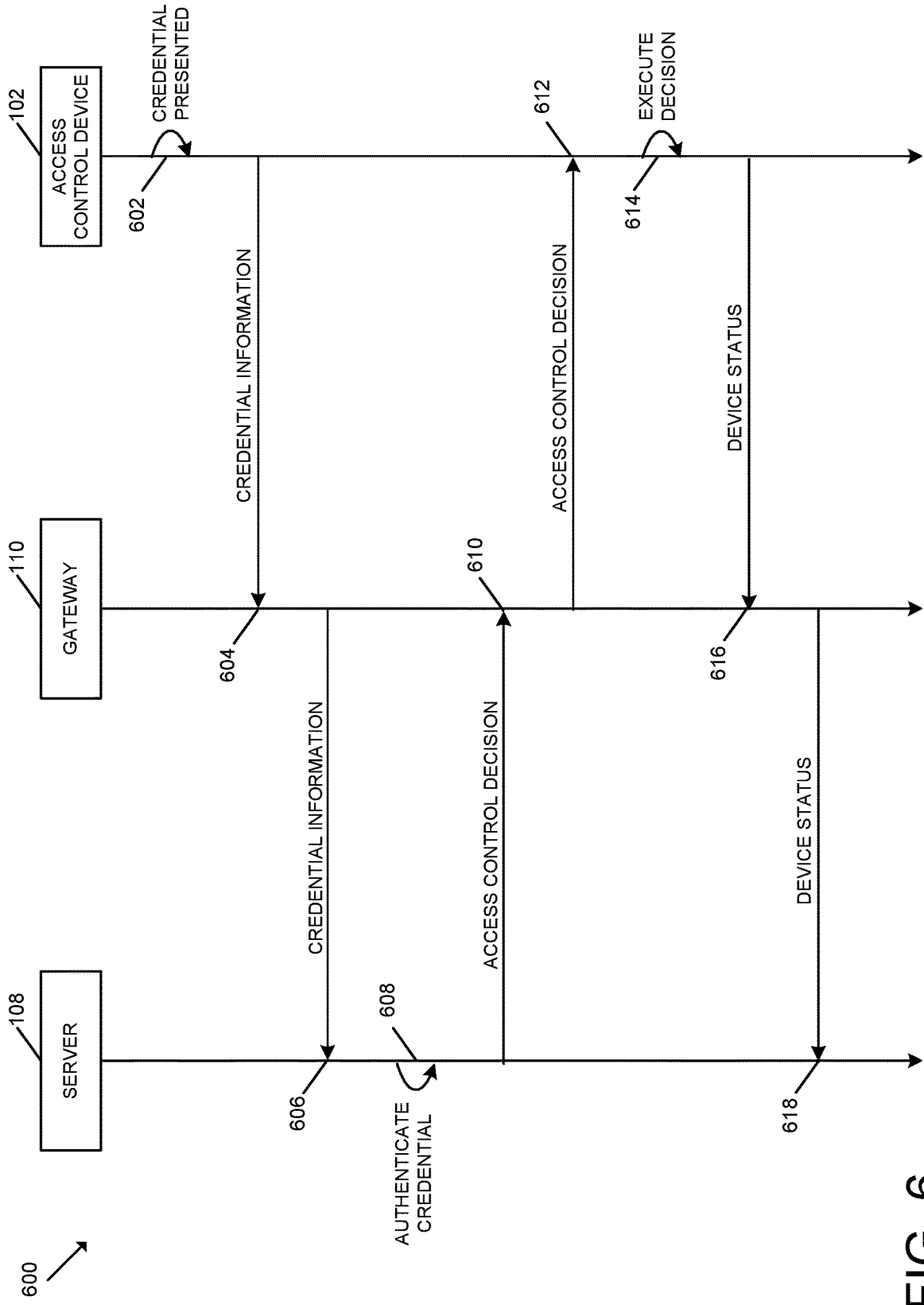
FIG. 6 is a simplified flow diagram of at least one other embodiment of a method of communicating access control information by configuring the gateway device to act as a client to a server.

Referring now to FIG. 6, in use, the access control system 100 may execute a method 600 for communicating access control information by configuring the gateway device 110 to act as a client to the server 108. It should be appreciated that the particular flows of the method 600 are illustrated by way of example, and such flows may be combined or divided, added or removed, and/or reordered in whole or in part depending on the particular embodiment, unless stated to the contrary. As described above, in some embodiments, the method 500 may be executed in conjunction with one or more of the features described above in reference to the "modified gateway as client mode" of the access control system 100.

The illustrative method 600 begins with flow 602 in which a credential 106 may be presented to the access control device 102. In flow 604, the access control device 102 transmits credential information/data associated with the credential 106 to the gateway device 110 (e.g., read from and/or received from the credential 106), and the gateway device 110 in turn transmits credential information/data (e.g., the same data or a credential index) to the server 108 in flow 606. In flow 608, the server 108 authenticates the credential information, for example, to determine access permissions associated with the credential and makes an access control decision/command (e.g., grant/deny access). In flow 610, the server 108 transmits the access control decision to the gateway device 110, which in turn transmits the access control decision to the access control device 102 in flow 612. In flow 614, the access control device 102 executes the access control decision. For example, in some embodiments, the access control device 102 may control an access control mechanism (e.g., a lock mechanism, a motor, and/or other components) to grant/deny access through a passageway.

In flow 616, the access control device 102 may transmit a status of the access control device 102 to the gateway device 110, which the gateway device 110 in turn may transmit/forward to the server 108 in flow 618. For example, in some embodiments, the status may indicate the lock status (locked/unlocked) and/or other conditions of the access control device 102.

Returning to flows 602-612, it should be appreciated that the access control device 102 may be unable to establish a connection with the gateway device 110, the gateway device 110 may be unable to establish a connection with the server 108, and/or the access control device 102 may not receive an access control decision from the server 108 (e.g., within a predefined period of time). After the predefined period of time has lapsed (e.g., subsequent to presentation of the credential to the access control device 102), as described above, the access control device 102 may authenticate the credential 106 and make the access control decision locally at the access control device 102 based on the current data of the local access control database in some embodiments. Upon successful reconnection, the access control device 102 may transmit the appropriate audit data to the gateway device 110 for transmittal to the server 108.

Although the flows 602-618 are described in a relatively serial manner, it should be appreciated that various flows of the method 600 may be performed in parallel in some embodiments.

Figure 7:
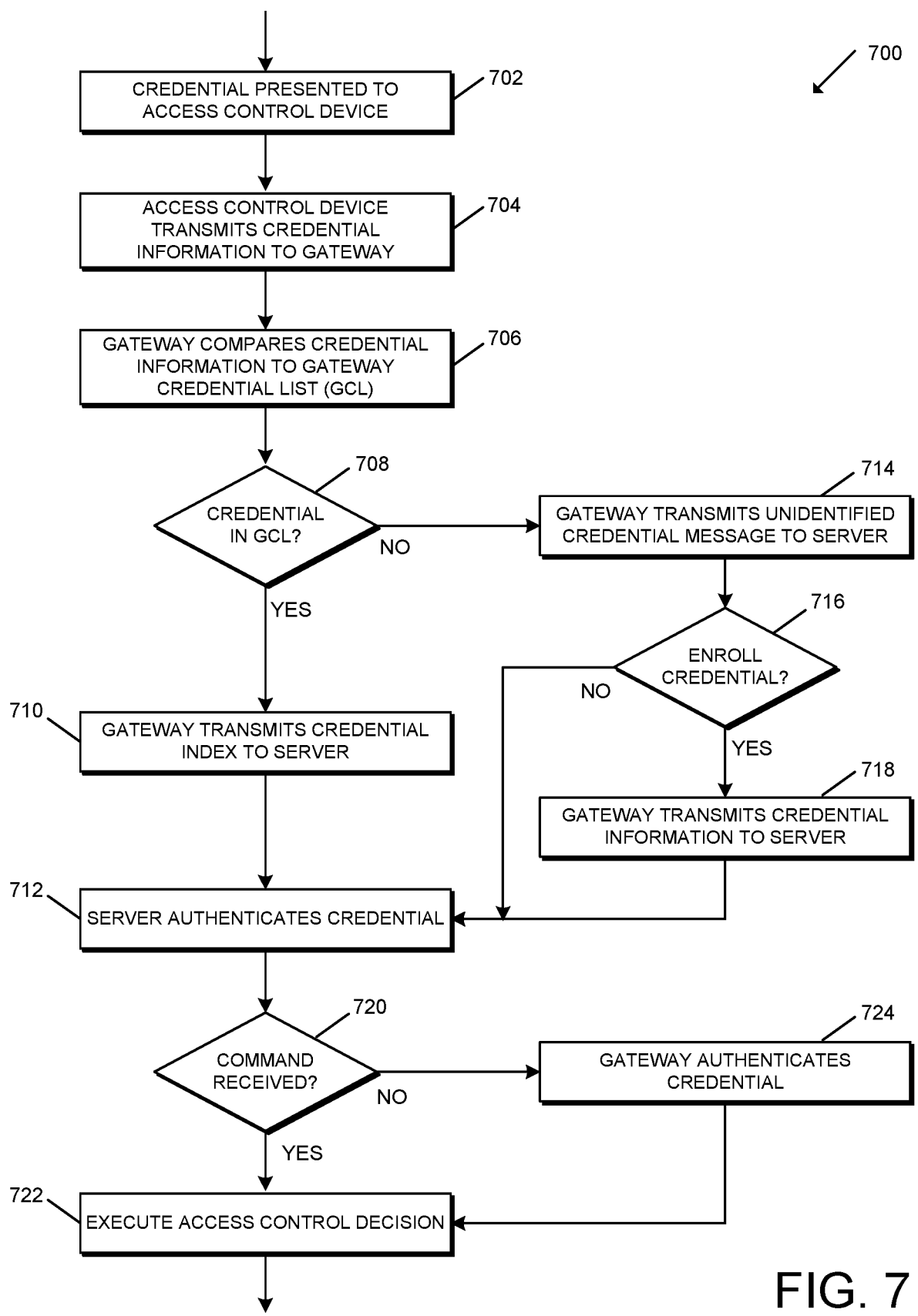
FIG. 7 is a simplified flow diagram of at least one embodiment of a method of making access control decisions.

Referring now to FIG. 7, in use, the access control system 100 may execute a method 700 for making access control decisions. It should be appreciated that the particular flows of the method 700 are illustrated by way of example, and such flows may be combined or divided, added or removed, and/or reordered in whole or in part depending on the particular embodiment, unless stated to the contrary. In some embodiments, it should be appreciated that the method 700 may be executed in conjunction with one or more of the features described above in reference to the "modified gateway as client mode" of the access control system 100.

The illustrative method 700 begins with block 702 in which a credential 106 may be presented to the access control device 102. In block 704, the access control device 102 transmits credential information/data associated with the credential 106 to the gateway device 110 (e.g., read from and/or received from the credential 106). In block 706, the gateway device 110 compares the credential information/data to a gateway credential list of the gateway device 110. For example, as indicated above, the gateway credential list may include/identify a set of credentials (e.g., as credential data, encrypted credential data, or otherwise) and a unique credential index associated with each such credential identified in the list. For example, in some embodiments, the credential indexes may be generated as strictly increasing (or strictly decreasing) indexes. As such, in the illustrative embodiment, the gateway device 110 compares the credential information/data to the gateway credential list to determine whether the credential information/data matches any of the entries of the list. In other words, the gateway device 110 determines whether the credential data is included in the gateway credential list. If so, the gateway device 110 identifies the unique credential index corresponding with the credential data.

If the gateway device 110 determines, in block 708, that the credential data is included in the gateway credential list, the method 700 advances to block 710 in which the gateway device 110 transmits the corresponding credential index to the server 108. In block 712, the server 108 authenticates the credential presented to the access control device 102 based on the credential index received from the gateway device 110, for example, to determine access permissions associated with the credential and make an access control decision/command (e.g., grant/deny access). In the illustrative embodiment, the server 108 may likewise include a credential list including a plurality of credentials (e.g., credential data) and corresponding credential indexes. For example, in some embodiments, the server's credential list may be a superset of the gateway device 110. In particular, the server's credential list, in some embodiments, may include the credential data and corresponding credential indexes for each of the credentials involved in and/or associated with the access control system 100. As such, the server 108 may compare the received credential index to its credential list to identify the matching credential data and authenticate that credential data (e.g., based on the particular access control device 102 to which access is requested) accordingly. It should be appreciated that the server 108 may transmit the access control decision to the gateway device 110, which in turn may transmit the access control decision to the access control device 102. It should be appreciated that the access control system 100 may perform a suitable error handling procedure in response to determining that the credential index does not match an index of the server's credential list.

Returning to block 708, if the gateway device 110 determines that the credential data is not included in the gateway credential list, the method 700 advances to block 714 in which the gateway device 110 transmits a message to the server 108 indicating that the credential data of the credential presented to the access control device 102 does not match any credential identified in the gateway credential list. In block 716, the server 108 may determine whether to enroll the presented credential into the access control system 100, for example, and assign suitable access rights to the credential. If so, the method 700 advances to block 718 in which the gateway device 110 transmits the credential data to the server 108 for enrollment.

In block 720, the access control device 102 determines whether an access control decision/command has been received from the server 108 (e.g., via the gateway device 110). If so, the method 700 advances to block 722 in which the access control device 102 executes the access control decision. For example, in some embodiments, the access control device 102 may control an access control mechanism (e.g., a lock mechanism, a motor, and/or other components) to grant/deny access through a passageway. However, if the access control decision 102 has not received an access control decision/command (e.g., after a predefined period of time has lapsed), the method 700 advances to block 724 in which the access control device 102 may authenticate the credential and make the access control decision locally at the access control device 102 based on the current data of the local access control database as described above.

Although the blocks 702-724 are described in a relatively serial manner, it should be appreciated that various blocks of the method 700 may be performed in parallel in some embodiments.

It should be appreciated that the methods 300-700 of FIGS. 3-7 are generally described agnostically with respect to the particular cryptographic and other security features employed in the communications between the various devices of the access control system 100 for simplicity and brevity of the disclosure. However, it should be appreciated that the various communications may utilize any suitable cryptographic and/or security features consistent with the description.

According to an embodiments, a method may include receiving, by a gateway device and from an access control device, credential data received by the access control device from a mobile device in response to presentation of the mobile device to the access control device, comparing, by the gateway device, the credential data to a gateway credential list stored in a memory of the gateway device, wherein the gateway credential list identifies a plurality of credentials associated with the gateway device, and wherein each credential of the plurality of credentials is associated with a unique credential index, transmitting, by the gateway device and to a server, the unique credential index associated with the credential data in response to determining that the credential data matches a corresponding credential in the gateway credential list, and receiving, by the gateway device and from the server, an access control decision associated with the credential data in response to transmitting the unique credential index.

In some embodiments, the gateway credential list may include the plurality of credentials and a corresponding set of strictly increasing unique credential indexes.

In some embodiments, the method may further include transmitting, by the gateway device, a message to the server indicating that the credential data does not match any credential identified in the gateway credential list.

In some embodiments, the method may further include enrolling, by the server, the credential data as an authorized credential of the mobile device in response to receiving the message from the gateway device.

In some embodiments, the method may further include authenticating, by the access control device, the credential data based on a local access control database stored in a memory of the access control device in response to a determination that the access control device has not received the access control decision from the server within a predefined period of time since transmittal of the credential data to the gateway device.

In some embodiments, the method may further include receiving, by the access control device, the access control decision from the gateway device, and executing, by the access control device, the access control decision to unlock a lock mechanism associated with the access control device.

In some embodiments, receiving the access control decision may include receiving the access control decision over a Bluetooth communication connection between the gateway device and the access control device.

In some embodiments, transmitting the unique credential index to the server may include transmitting the unique credential index to the server via a WebSocket communication connection between the gateway device and the server.

In some embodiments, the memory of the gateway device may have a greater amount of data storage than a memory of the access control device.

According to another embodiment, a system may include a server, an access control device configured to receive credential data from a mobile device presented to the access control device, and a gateway device communicatively coupled to the server and to the access control device, wherein the gateway device includes a memory having a gateway credential list stored thereon that identifies a plurality of credentials associated with the gateway device, each credential of the plurality of credentials being associated with a unique credential index, and wherein the gateway device is configured to receive the credential data from the access control device, compare the credential data to the gateway credential list, transmit the unique credential index associated with the credential data to the server in response to a determination that the credential data matches a corresponding credential in the gateway credential list, and receive an access control decision associated with the credential data from the server in response to transmittal of the unique credential index.

In some embodiments, the gateway credential list may include the plurality of credentials and a corresponding set of strictly increasing unique credential indexes.

In some embodiments, the gateway device may be further configured to transmit a message to the server indicating that the credential data does not match any credential identified in the gateway credential list, and the server may be configured to enroll the credential data as an authorized credential of the mobile device in response to receipt of the message from the gateway device.

In some embodiments, the access control device may include a local access control database and may be further configured to authenticate the credential data based on the local access control database in response to a determination that the access control device has not received the access control decision from the server within a predefined period of time since transmittal of the credential data to the gateway device.

In some embodiments, the access control device may be further configured to receive the access control decision from the gateway device and execute the access control decision to unlock a lock mechanism associated with the access control device.

In some embodiments, transmittal of the unique credential index to the server may include transmittal of the unique credential index to the server via a WebSocket communication connection between the gateway device and the server.

According to yet another embodiment, a gateway device may include a processor and a memory comprising a gateway credential list and a plurality of instructions stored thereon, wherein the gateway credential list identifies a plurality of credentials associated with the gateway device, wherein each credential of the plurality of credentials is associated with a unique credential index, and wherein execution of the plurality of instructions by the processor causes the gateway device to receive, from an access control device, credential data received by the access control device from a mobile device in response to presentation of the mobile device to the access control device, compare the credential data to the gateway credential list, transmit, to a server, the unique credential index associated with the credential data in response to determining that the credential data matches a corresponding credential in the gateway credential list, and receive, from the server, an access control decision associated with the credential data in response to transmitting the unique credential index.

In some embodiments, the gateway credential list may include the plurality of credentials and a corresponding set of strictly increasing unique credential indexes.

In some embodiments, the plurality of instructions may further cause the gateway device to transmit a message to the server indicating that the credential data does not match any credential identified in the gateway credential list.

In some embodiments, receipt of the access control decision may involve receipt of the access control decision over a Bluetooth communication connection between the gateway device and the access control device.

In some embodiments, transmittal of the unique credential index to the server may include transmittal of the unique credential index to the server via a WebSocket communication connection between the gateway device and the server.

What is claimed is:

1. A method, comprising:
   receiving, by a gateway device and from an access control device, credential data received by the access control device from a credential device in response to presentation of the credential device to the access control device;
   comparing, by the gateway device, the credential data to a gateway credential list stored in a memory of the gateway device, wherein the gateway credential list identifies a plurality of credentials, and wherein each credential of the plurality of credentials is associated with a unique credential index;
   transmitting, by the gateway device and to a third computing device, the unique credential index associated with the credential data in response to determining that the credential data matches a corresponding credential in the gateway credential list; and
   authenticating, by the access control device, the credential data based on a local access control database stored in a memory of the access control device in response to a determination that the access control device has not received an access control decision from the third computing device within a predefined period of time since transmittal of the credential data to the gateway device.

2. The method of claim 1, wherein the gateway credential list includes the plurality of credentials and a corresponding set of strictly increasing unique credential indexes.

3. The method of claim 1, further comprising transmitting, by the gateway device, a message to the third computing device indicating that the credential data does not match any credential identified in the gateway credential list.

4. The method of claim 3, further comprising enrolling, by the third computing device, the credential data as an authorized credential of the credential device in response to receiving the message from the gateway device.

5. The method of claim 1, further comprising:
   receiving, by the access control device, an access control decision from the gateway device; and
   executing, by the access control device, the access control decision to unlock a lock mechanism associated with the access control device.

6. The method of claim 5, wherein receiving the access control decision comprises receiving the access control decision over a Bluetooth communication connection between the gateway device and the access control device.

7. The method of claim 1, wherein transmitting the unique credential index to the third computing device comprises transmitting the unique credential index to the third computing device via a WebSocket communication connection between the gateway device and the third computing device.

8. The method of claim 1, wherein the memory of the gateway device has a greater amount of data storage than memory of the access control device.

9. A system, comprising:
   a computing device;
   an access control device comprising a local access control database and configured to receive credential data from a credential device presented to the access control device; and
   a gateway device communicatively coupled to the computing device and to the access control device, wherein the gateway device includes a memory having a gateway credential list stored thereon that identifies a plurality of credentials, each credential of the plurality of credentials being associated with a unique credential index, and wherein the gateway device is configured to:
      receive the credential data from the access control device;
      compare the credential data to the gateway credential list; and
      transmit the unique credential index associated with the credential data to the computing device in response to a determination that the credential data matches a corresponding credential in the gateway credential list; and
   wherein the access control device is further configured to authenticate the credential data based on the local access control database in response to a determination that the access control device has not received an access control decision from the computing device within a predefined period of time since transmittal of the credential data to the gateway device.

10. The system of claim 9, wherein the gateway credential list includes the plurality of credentials and a corresponding set of strictly increasing unique credential indexes.

11. The system of claim 9, wherein the gateway device is further configured to transmit a message to the computing device indicating that the credential data does not match any credential identified in the gateway credential list; and wherein the computing device is configured to enroll the credential data as an authorized credential of the credential device in response to receipt of the message from the gateway device.

12. The system of claim 9, wherein the access control device is further configured to:

receive an access control decision from the gateway device; and execute the access control decision to unlock a lock mechanism associated with the access control device.

13. The system of claim 9, wherein to transmit the unique credential index to the computing device comprises to transmit the unique credential index to the computing device via a WebSocket communication connection between the gateway device and the computing device.

\* \* \* \* \*